United States Patent [19]
Hunt

[11] Patent Number: 5,860,446
[45] Date of Patent: Jan. 19, 1999

[54] METHOD AND APPARATUS FOR SAFELY CONTROLLING FLUID FLOW

[75] Inventor: Christopher C. Hunt, Newberg, Oreg.

[73] Assignee: Climax Portable Machine Tools, Inc., Newberg, Oreg.

[21] Appl. No.: 614,277

[22] Filed: Mar. 12, 1996

[51] Int. Cl.⁶ ............................................... F16K 17/164
[52] U.S. Cl. ....................................... 137/464; 137/465
[58] Field of Search ................................. 137/463, 464, 137/465

[56] References Cited

U.S. PATENT DOCUMENTS

| | | | |
|---|---|---|---|
| 349,389 | 9/1886 | Gennet et al. | 137/465 |
| 825,718 | 7/1906 | Grimes | 137/465 |
| 1,500,587 | 7/1924 | Larson . | |
| 1,510,038 | 9/1924 | Camblin . | |
| 1,724,389 | 8/1929 | Abel | 137/464 X |
| 2,081,542 | 5/1937 | Kidney | 137/153 |
| 2,806,484 | 9/1957 | Schultz | 137/463 X |
| 3,510,099 | 5/1970 | Crump | 251/116 |
| 3,786,828 | 1/1974 | Krechel | 137/116 |
| 3,823,739 | 7/1974 | McMullan | 137/624.27 |
| 4,173,986 | 11/1979 | Martin | 137/463 X |
| 4,252,145 | 2/1981 | Peters | 137/458 |
| 4,813,492 | 3/1989 | Biek | 173/2 |

*Primary Examiner*—Stephen M. Hepperle
*Attorney, Agent, or Firm*—Dellett and Walters

[57] ABSTRACT

A method and apparatus for safely controlling fluid flow comprises a safety control valve that automatically stops fluid flow upon a fluid pressure failure, requires two-handed manual operation to open the valve, and the valve being biased to prevent being left in the open position in the absence of fluid pressure. The safety control valve comprises a valve body that coaxially receives therein a slidable spool manually operable in an axial direction between a closed valve position and an open valve position. The valve further comprises a spring and a spring biased coaxial safety piston capable of axial movement along the spool and being pneumatically connected to a fluid supply line. In the absence of fluid pressure, the spring biases a safety piston against a contact surface of the spool so as to bias the spool into the closed position thereby preventing fluid flow through the valve. In the presence of a sufficient fluid pressure in the fluid supply line, the fluid pressure biases the safety piston against the spring and away from the contact surface of the spool so as to prevent movement of the spool between the open and closed positions.

21 Claims, 5 Drawing Sheets

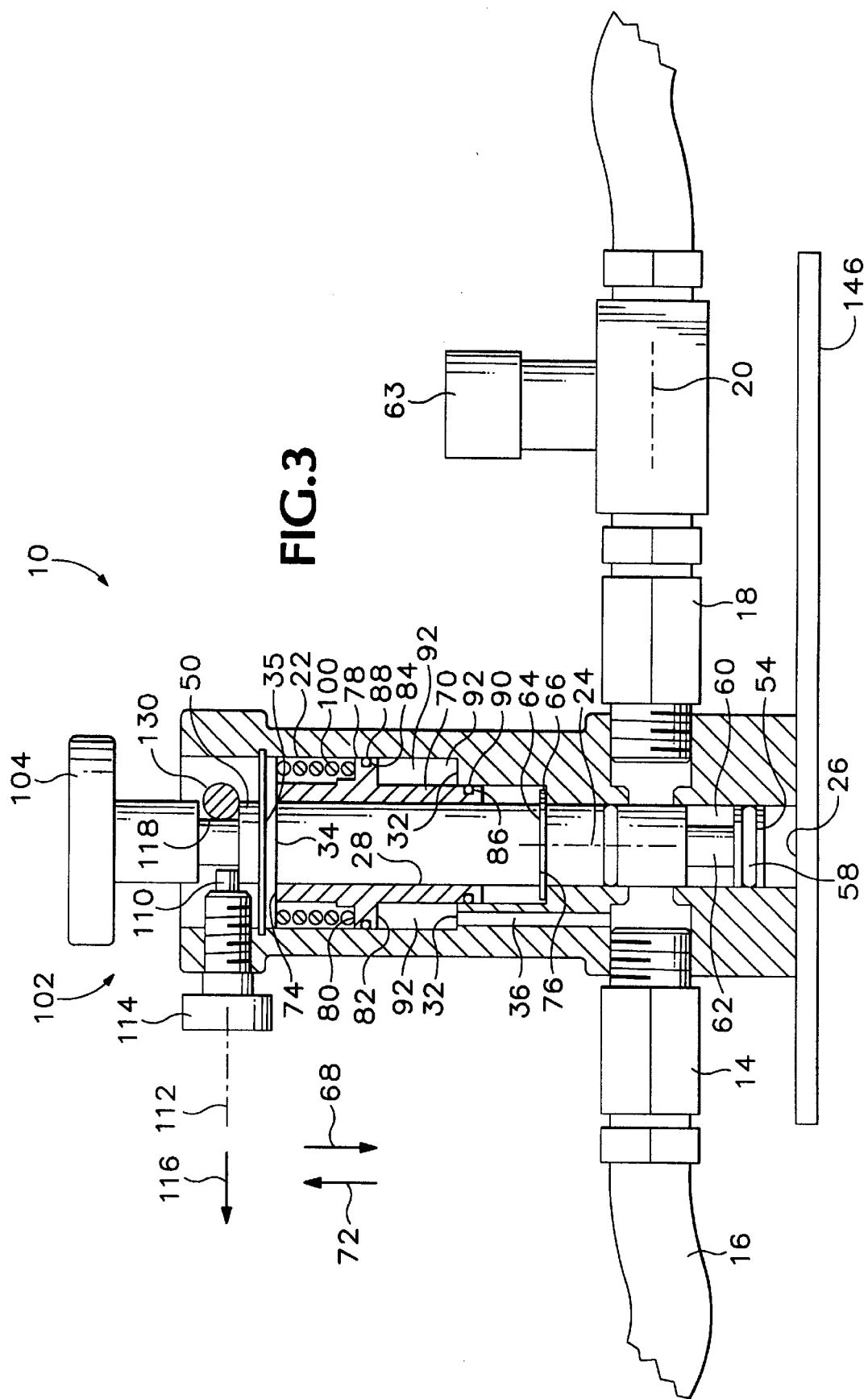

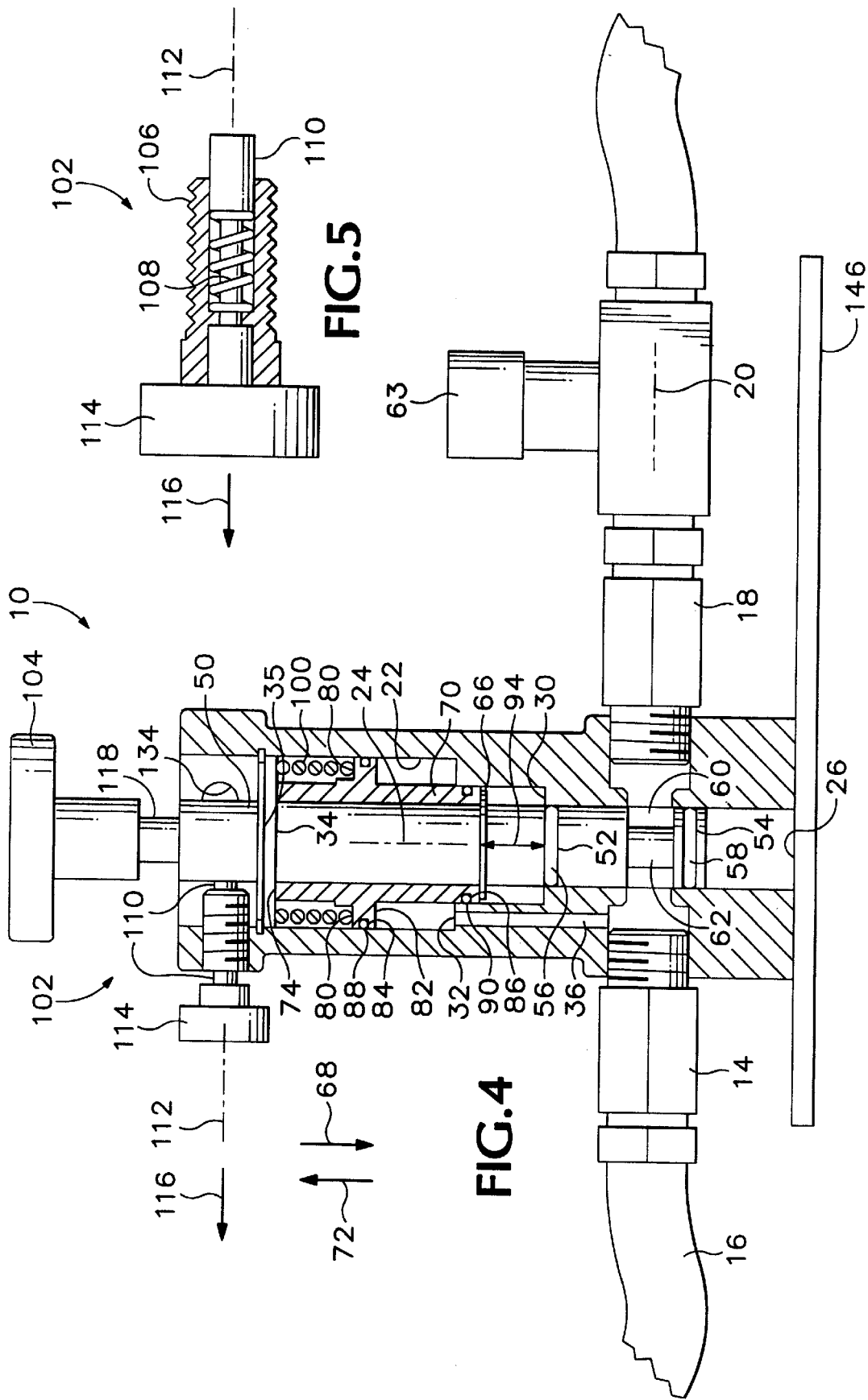

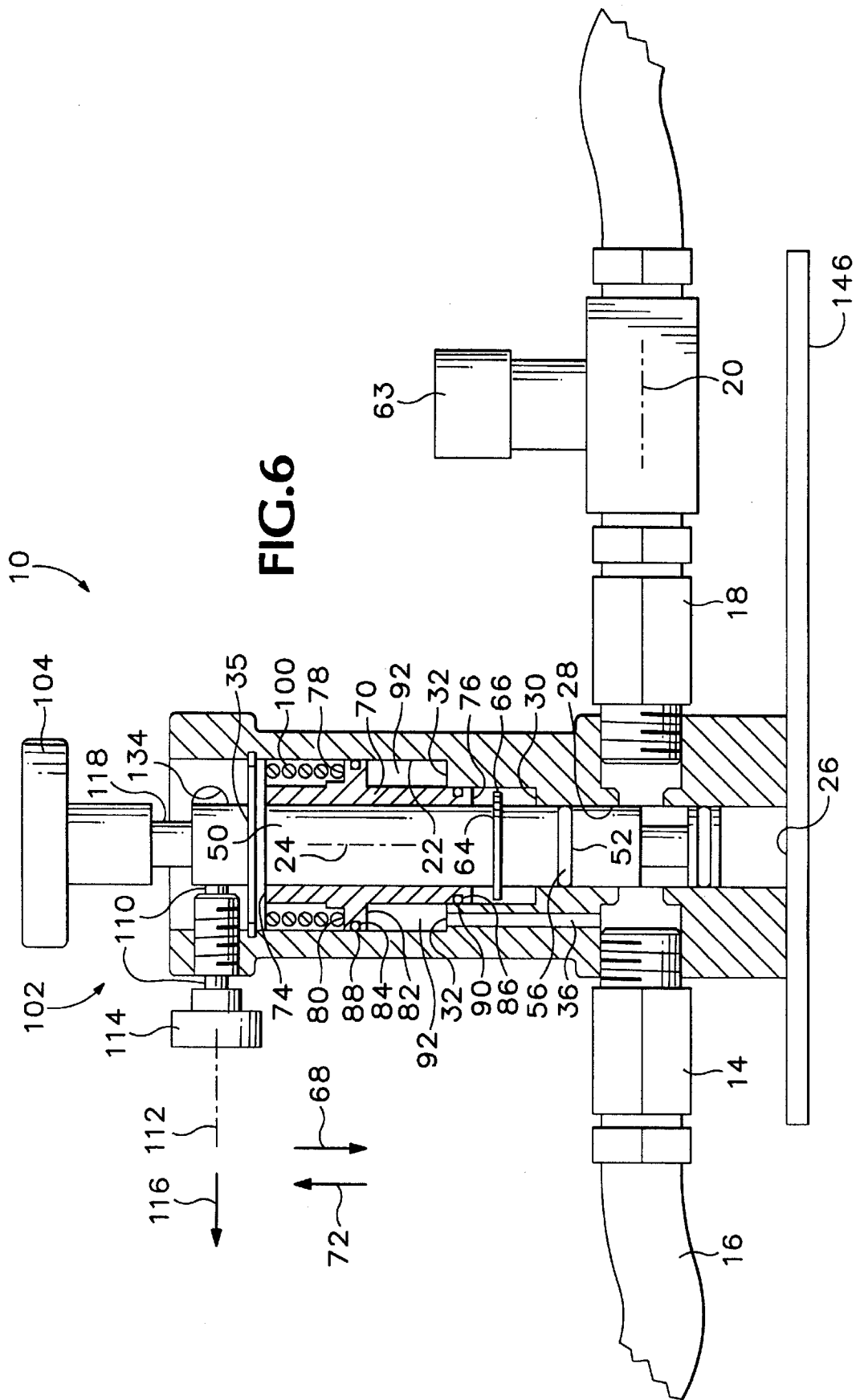

METHOD AND APPARATUS FOR SAFELY CONTROLLING FLUID FLOW

The present invention relates to a safety valve, and more particularly, to a safety valve that automatically stops fluid flow through the valve when the inlet fluid pressure becomes too low, and that requires a two-handed operation to reopen the valve once inlet fluid pressure returns.

BACKGROUND OF THE INVENTION

Valves are used to control fluid flow between two points, such as between an air supply line and an air driven motor. Conventional valves require one-handed manual operation to open or close the valve and give virtually no visual indication to an operator as to whether the valve is in the open or the closed position. Additionally, conventional valves may be left open and do not automatically stop fluid flow upon a loss of fluid pressure.

These conventional valves expose operators, therefore, to hazards such as allowing an operator to open the valve while having one hand positioned adjacent the motor, and unknowingly leaving the valve in an open position, resulting in surprise starting of the motor upon the application of air pressure. Such conventional valves also expose operators to hazards such as surprise restarting of the motor upon the reapplication of fluid pressure.

SUMMARY OF THE INVENTION

Accordingly, an object of the present invention is to provide an improved safety control valve that automatically stops fluid flow upon an inlet fluid pressure failure.

Another object of the present invention is to provide an improved safety control valve that requires two-handed manual operation to open the valve.

Yet another object of the present invention is to provide an improved safety control valve that cannot be left in the open position in the absence of inlet fluid pressure.

Still another object of the present invention is to provide an improved safety control valve that is simple and reliable in construction.

A further object of the present invention is to provide an improved safety control valve that permits manual closure of the valve should it become damaged.

Accordingly, the present invention provides a safety control valve that automatically stops fluid flow upon a fluid pressure failure and requires two-handed manual operation to open the valve. Additionally, the present invention provides a safety control valve that cannot be left in the open position in the absence of fluid pressure, is simple and reliable in construction, and permits manual closure of the valve should it become damaged.

In a preferred embodiment the safety control valve is adapted for connection between an air supply line and an air motor. The valve, however, may be used to control any type of fluid flow. The valve comprises a valve body that coaxially receives therein a slideable spool manually operable in an axial direction between a closed valve position and an open valve position. The valve further comprises a spring and a spring biased coaxial safety piston capable of axial movement along the spool and being pneumatically connected to the air supply line. In the absence of air pressure, the spring biases the safety piston against a contact surface of the spool so as to bias the spool into the closed position thereby preventing air flow through the valve. In the presence of a sufficient air pressure in the air supply line, the air pressure biases the safety piston against the spring and away from the contact surface of the spool so as to permit movement of the spool between the open and closed positions.

The safety control valve may further comprise a spring biased lockout plunger provided within the valve body that is nominally biased into a locked position thereby preventing movement of the spool from the closed position to the open position. In this embodiment, the spool and the plunger must be simultaneously manually operated, in the presence of a sufficient air pressure, in order to move the spool to the open position.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 3 is a partial cross-sectional side view of the valve of FIG. 1 wherein fluid pressure is applied at the supply line and the valve is in the closed position;

FIG. 4 is a partial cross-sectional side view of the valve of FIG. 1 wherein fluid pressure is applied at the supply line and the valve is in the open position;

FIG. 5 is a detailed partial cross-sectional side view of the lockout plunger of FIG. 1; and FIG. 6 is a partial cross-sectional side view of the valve of FIG. 1 wherein fluid pressure is applied at the supply line and the valve is in the semi-open position.

DETAILED DESCRIPTION

Figure 1:
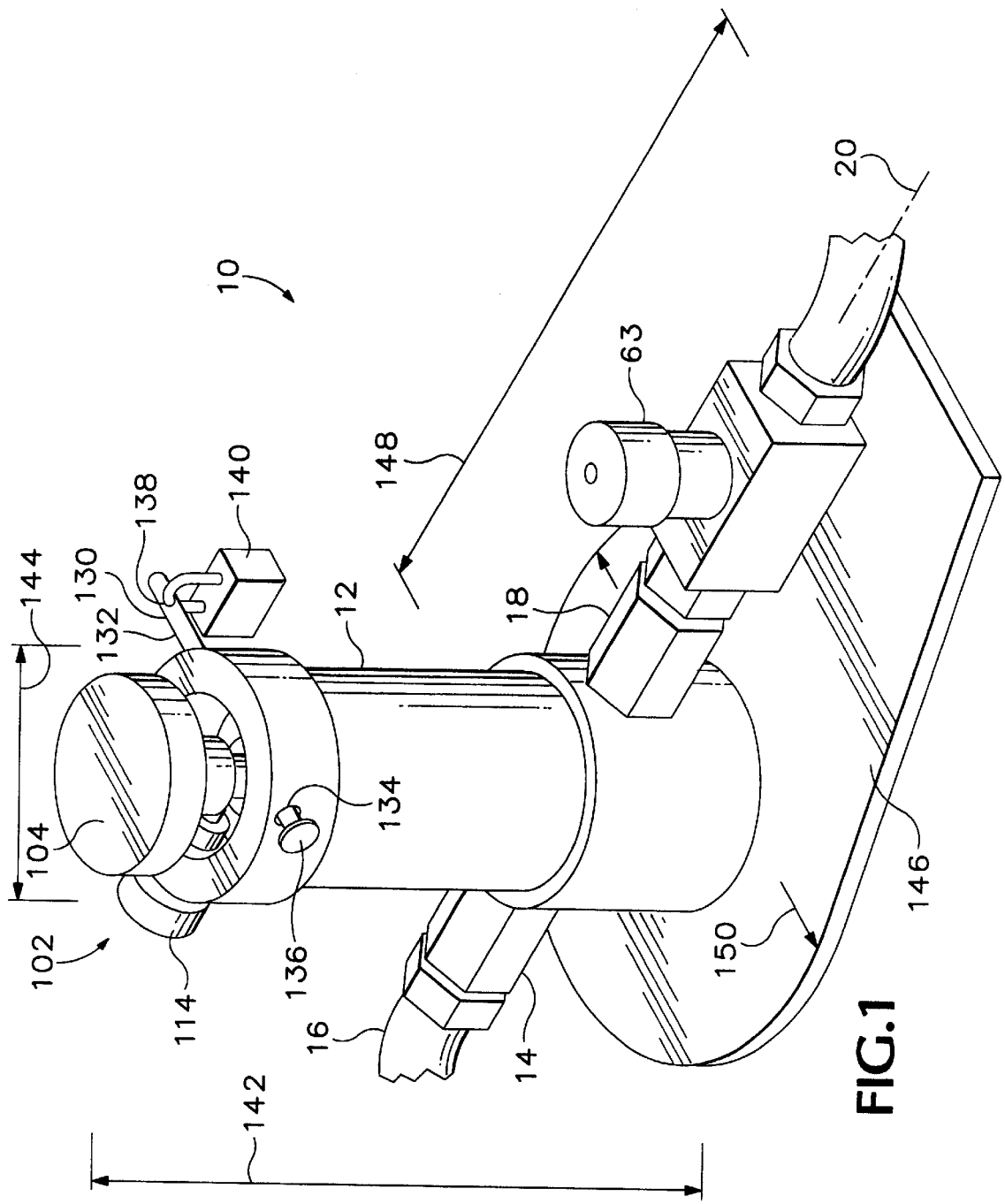
FIG. 1 is an isometric front view of the safety control valve of the present invention.

Referring to FIG. 1, the present invention comprises a safety control valve 10 including a valve body 12 that defines an inlet port 14 preferably connected to a fluid supply line 16 and an outlet port 18 preferably connected to an air motor (not shown). Supply line 16, inlet port 14 and outlet port 18 preferably are coaxially aligned along a fluid axis 20 such that the pressure drop across valve 10 in the open position is minimized.

Figure 2:
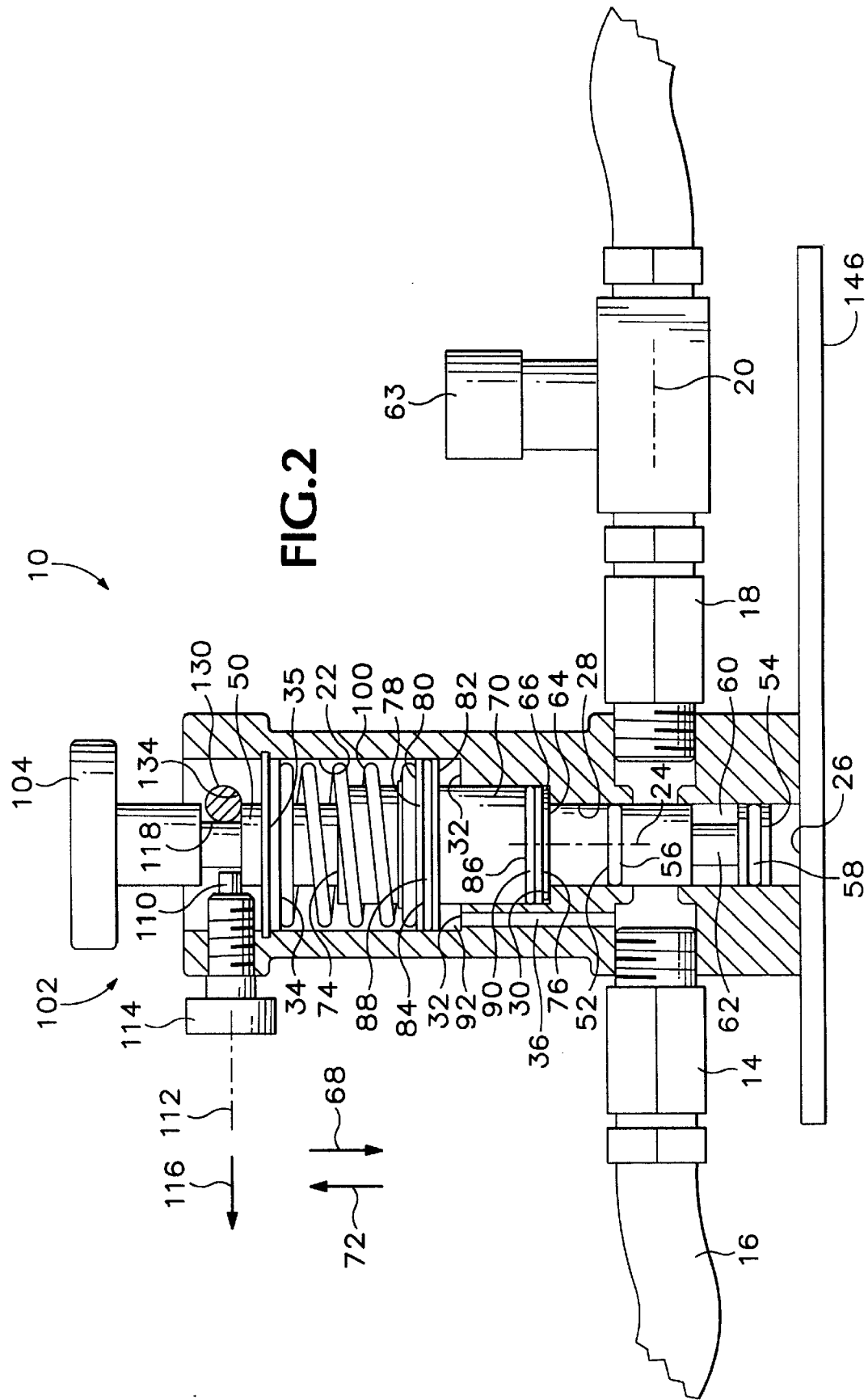
FIG. 2 is a partial cross-sectional side view of the valve of FIG. 1 wherein no fluid pressure is applied at the supply line and the valve is in the closed position.

Referring to FIG. 2, valve body 12 further defines a central cavity 22 having an elongate axis 24 and being enclosed by a bottom surface 26, a side wall 28, a lower shoulder 30, a middle shoulder 32 and an upper surface 34 including an aperture 35. Valve body 12 also includes an internal passageway 36 pneumatically connecting inlet port 14 and central cavity 22 at middle shoulder 32.

Valve 10 further comprises a spool 50 that preferably is an elongate cylinder adapted for movement through aperture 35 and along elongate axis 24 between an open position (FIG. 4) and a closed position (FIGS. 2 and 3). Spool 50 comprises recessed regions 52 and 54 having, respectively, O-rings 56 and 58 positioned therein so as to define an airtight region 60 within cavity 22 and between O-rings 56 and 58. Spool 50 further comprises a relieved annular region 62 that, in the closed spool position, is not aligned with fluid axis 20. In the open position (FIG. 4) relieved annular region 62 is aligned with inlet and outlet ports, 14 and 18, such that when fluid pressure is applied at the inlet port, fluid may travel along axis 20 through airtight region 60 of valve 10 thereby powering the air motor. Spool 50 may also be positioned in a semi-open position (FIG. 6) such that a portion of relieved annular region 62 is aligned with fluid axis 20 thereby permitting a reduced fluid flow through valve 10. O-rings 56 and 58 are positioned on spool 50 such that in the open, semi-open, and closed positions, the O-rings pneumatically encompass inlet and outlet ports 14 and 18. Additionally, fluid flow may be controlled by a needle valve 63 positioned adjacent outlet port 18.

Spool 50 further comprises a recess 64 and a snapring 66 received therein. Snapring 66 is preferably manufactured of a generally rigid material that extends perpendicularly outwardly from spool 50 such that a force on snapring 66 in a downward direction 68 will move spool 50 in direction 68. Upon continued downward movement of spool 50, snapring 66 will contact lower shoulder 30 of cavity 22. Such contact prevents further downward movement of the spool and thereby defines the closed position of valve 10 as shown in FIGS. 2 and 3.

Valve 10 further comprises a safety piston 70 coaxially disposed within cavity 22 and around spool 50. Piston 70 is adapted for movement along spool 50 in downward direction 68 and in an upward direction 72. Piston 70 includes an upper stop surface 74, a lower stop surface 76 and a radial flange 78 having an upper flange surface 80 and a lower flange surface 82. Piston 70 further comprises recesses 84 and 86 having positioned therein, respectively, O-rings 88 and 90 thereby defining an expandable airtight upper region 92 of internal passageway 36. When fluid pressure is applied at inlet port 14, therefore, the pressure is conducted through internal passageway 36 to airtight upper region 92 thereby exerting pressure on lower flange surface 82 of piston 70. This pressure biases piston 70 to move upwardly in direction 72 along spool 50 such that piston 70 moves from a lower position (FIG. 2) to an upper position (FIGS. 3 and 4).

In the lower position, lower stop surface 76 of piston 70 contacts snapring 66 and in the upper position, lower stop surface 76 is moved upwardly away from snapring 66 in direction 72. The upward extent of movement of piston 70 is limited by contact of upper stop surface 74 of piston 70 with upper surface 34 of cavity 22. In this upper position, lower stop surface 76 of piston 70 and lower shoulder 30 of cavity 22 define a region of movement 94 (FIG. 4) through which snapring 66 may move along axis 24. Accordingly, when pressure is applied at inlet 14, spool 50 is capable of movement between the open position (FIG. 4) wherein snapring 66 contacts lower stop surface 76 of piston 70 in an upper position, and a closed position (FIG. 3) wherein snapring 66 contacts lower shoulder 30 of cavity 22.

As shown in FIGS. 2–4, piston 70 is positioned upwardly of snapring 66 along axis 24 such that the piston cannot lock spool 50 in the open position. Accordingly, damage to piston 70 will not prevent manual movement of spool 50 from the open position to the closed position. Valve 10 has a safety feature, therefore, that the valve is simpler in design and more reliable than conventional valves such as multiple pilot valve systems, pilot circuit valve systems, or air logic systems.

In the preferred embodiment, valve 10 includes a coil spring 100 coaxially positioned within cavity 22 such that spring 100 contacts upper surface 34 of cavity 22 and upper flange surface 80 of piston 70. Spring 100 preferably has a spring pressure of approximately 48 pounds so as to nominally bias piston 70 downwardly in direction 68 such that lower stop surface 76 of piston 70 contacts snapring 66 and forces the snapring against lower shoulder 30 of cavity 22. When a fluid pressure force of greater than approximately 35 absolute psi is applied at inlet port 14, piston 70 is forced upwardly in direction 72 by the pressure force such that spring 100 is compressed. Compression of spring 100, however, does not move spool 50 along axis 24.

Valve 10 has a safety feature, therefore, that a lowering of fluid pressure at inlet port 14 below a predetermined level, preferably approximately 35 absolute psi, results in spring biased movement of piston 70 downwardly in direction 68 so as to move spool 50 into the closed position. In this closed position, fluid flow from inlet port 14 to outlet port 18 is prevented thereby preventing surprise start-up of the air motor connected to outlet port 18 upon the reapplication of fluid pressure at inlet port 14. Valve 10 prevents, therefore, an operator from manually moving spool 50 into the open position and then leaving the valve in such an open position, because upon release of spool 50, without the predetermined level of pressure at inlet 14, spring 100 automatically biases the spool into the closed position. A subsequent operator is protected against surprise start of the air motor upon restart of pressure at the inlet port.

In other embodiments, piston 70 may comprise an actuator such as a leaf spring, a lever, a nitrogen cylinder, an air logic switch, or a bellows system. Additionally, piston 70 may be manufactured in any shape that facilitates the safety features of the present invention. Furthermore, spring 100 may comprise a leaf spring, a tension spring, or any such pressurized device.

Valve 10 further comprises a spring loaded lockout plunger 102 positioned within valve body 12 and generally adjacent a mushroom handle 104 of spool 50. Referring to FIG. 5, plunger 102 includes a casing 106, a spring 108, and a plunger tip 110 operable for spring biased movement along a plunger axis 112 by manual movement of a plunger knob 114 in a direction 116. Upon release of knob 114, when spool 50 is in the closed position, spring 108 biases tip 110 into a relieved annular region 118 (FIG. 2) of spool 50 thereby preventing movement of spool 50 along axis 24. To move spool 50 into the open position, therefore, an operator must manually move knob 114 in direction 116 such that plunger tip 110 is removed from relieved annular region 118. The operator must simultaneously manually move handle 104 in upward direction 72.

In the preferred embodiment, plunger axis 112 and spool axis 24 are perpendicular such that an operator cannot move knob 114 and spool handle 104 with the same hand. Valve 10 has a safety feature, therefore, that an operator must used both hands to open valve 10 such that the operator's hands may not be positioned adjacent the air motor upon application of air pressure to the motor through valve 10. In addition, upon a loss of fluid pressure at inlet port 14, spring 100 biases spool 50 into the closed position such that spring 108 biases plunger tip 110 into relieved annular region 118, thereby releasably locking spool 50 in the closed position.

Mushroom handle 104 is preferably manufactured in a red color indicating a commonly recognized "stop operation" feature of the handle. Additionally, valve 10 has a natural ergonomic standardization because handle 104 is positioned upwardly of valve body 12 when spool 50 is the open position and handle 104 is positioned downwardly against valve body 12 when spool 50 is in the closed position. Valve 10 has a safety feature, therefore, of constant operator familiarity thereby decreasing orientation time in the case of an emergency.

Referring to FIG. 1, valve 10 may further comprise a locking pin 130 having an elongate portion 132 received within a locking aperture 134 in valve body 12. Pin 130 preferably includes an enlarged pinhead 136 and a pin aperture 138 adapted to receive a padlock 140 for locking pin 130 in place. Relieved annular region 118 of spool 50 is positioned adjacent locking aperture 134 when spool 50 is in the closed position. Insertion of pin 130 into aperture 134 and locking of padlock 140 through pin aperture 138, therefore, locks spool 50 in the closed position. Insertion of pin 130 into aperture 134 is not possible when spool 50 is not in the closed position because the spool partially blocks access to aperture 134 (FIG. 4). Valve 10 has a safety feature, therefore, that an operator cannot lock the valve in the open position.

Referring to FIG. 1, in the preferred embodiment, valve body 12 is approximately 8 inches measured along height 142, and is approximately 3 inches measured along diameter 144. Valve body 12 is preferably mounted on a base 146 having a length dimension 148 of approximately 12 inches and a width dimension 150 of approximately 8 inches. In this embodiment, base 146 is preferably positioned on a shop floor and may be held in place by the operator's foot as the operator moves spool 50 into the open position.

In the preferred embodiment, valve body 12 is manufactured of aluminum and spool 50 and piston 70 are manufactured of steel. However, the components of the valve 10 may be manufactured of any material, such as metal or engineered plastic, that will withstand the pressures associated with use of the valve.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A pneumatic safety valve, comprising:
    a valve body including an inlet port and an outlet port and defining a cavity having an elongate axis;
    a valve piston coaxially received within the cavity and adapted for movement along the elongate axis between a closed position and an open position, the valve piston including a control surface and defining a passageway adapted for alignment with the inlet and outlet ports when the valve piston is in the open position;
    a safety actuator received within the cavity and adapted for movement along the valve piston, the safety actuator including a safety surface adapted for movement toward the control surface; and
    a biasing element disposed within the cavity and biasing the safety surface toward the control surface so as to bias the valve piston into the closed position such that the passageway is not aligned with the inlet and outlet ports.

2. A pneumatic safety valve according to claim 1 wherein the valve body further comprises an internal conduit pneumatically connecting the inlet port and the safety actuator such that a predetermined fluid pressure at the inlet port is conducted to the safety actuator so as to bias the safety surface away from the control surface.

3. A pneumatic safety valve according to claim 2 further comprising a release plunger that releasably secures the valve piston in the closed position.

4. A pneumatic safety valve according to claim 3 wherein the release piston defines a release piston axis that is perpendicular to the elongate axis.

5. A pneumatic safety valve according to claim 2 wherein the biasing element defines a biasing force and wherein the predetermined fluid pressure defines a pressure force greater than the biasing force.

6. A pneumatic safety valve according to claim 1 further comprising a locking device adapted for locking the valve piston in the closed position.

7. A pneumatic safety valve according to claim 1 wherein the valve piston is generally cylindrical and wherein the passageway is a relieved annular area.

8. A pneumatic safety valve according to claim 1 wherein the safety actuator is a safety piston that encircles the valve piston.

9. An emergency fluid safety control valve comprising:
    shell means including inlet and outlet means and defining a cavity having an elongate axis;
    operation means coaxially received within the cavity and adapted for movement along the elongate axis between a closed position and an open position, the operation means including an operation surface and defining connection means adapted for permitting fluid to move from the inlet means to the outlet means;
    safety means operatively connected to the operation means and adapted for movement within the shell means, the safety means including a safety surface aligned with the operation surface; and
    biasing means operatively connected to the safety means and biasing the safety surface toward the operation surface so as to bias the operation means into the closed position such that the connection means does not permit fluid to move from the inlet means to the outlet means.

10. An emergency fluid safety control valve according to claim 9 wherein the shell means further comprises conduit means that connects the inlet port and the safety means such that a predetermined fluid pressure at the inlet port is conducted to the safety means so as to bias the safety surface away from the connection surface.

11. An emergency fluid safety control valve according to claim 10 further comprising release means that releasably secures the operation means in the closed position.

12. An emergency fluid safety control valve according to claim 11 wherein the release means defines a release means axis that is perpendicular to the elongate axis.

13. An emergency fluid safety control valve according to claim 10 wherein the biasing means defines a biasing force and wherein the predetermined fluid pressure defines a pressure force greater than the biasing force.

14. An emergency fluid safety control valve according to claim 9 further comprising locking means adapted for locking the operation means in the closed position.

15. An emergency fluid safety control valve according to claim 9 wherein the operation means is a generally cylindrical piston and wherein the passageway is a relieved annular area.

16. An emergency fluid safety control valve according to claim 9 wherein the safety means encircles the operation means.

17. A method of controlling a fluid safety valve comprising:
    conducting fluid at a predetermined pressure to an inlet port such that the predetermined pressure biases a safety piston into an open position away from contact with the valve piston;
    manipulating a releasable plunger with a first hand so as to permit movement of a valve piston along a piston axis;

simultaneous with manipulation of the releasable plunger, moving with a second hand the valve piston along the piston axis to an open position so as to permit fluid to flow through the inlet port to an outlet port.

18. A method of controlling a fluid safety valve according to claim 17 further comprising moving the valve piston along the piston axis to a closed position so as to prevent fluid from flowing through the inlet port to the outlet port without regard to the position of the safety piston or the presence of fluid pressure.

19. A method of controlling a fluid safety valve according to claim 17 further comprising conducting fluid to the inlet port at a pressure less than the predetermined pressure thereby permitting a biasing element to bias the safety piston onto the valve piston causing it to move into a closed position so as to prevent fluid from flowing through the inlet port to the outlet port.

20. A method of controlling a fluid safety valve according to claim 19 further comprising locking the valve piston in the closed position.

21. A method of controlling a fluid safety valve comprising:

conducting fluid at a predetermined pressure to an inlet port such that the predetermined pressure biases a safety piston into an open position;

manipulating a releasable plunger so as to permit movement of a valve piston along a piston axis, simultaneous with manipulation of the releasable plunger, moving the valve piston along the piston axis to an open position so as to permit fluid to flow through the inlet port to an outlet port; and further moving the valve piston along the piston axis to a semi-open position so as to permit a reduced fluid flow through the inlet port to the outlet port.

* * * * *